United States Patent [19]
Brown et al.

[11] Patent Number: 5,102,099
[45] Date of Patent: Apr. 7, 1992

[54] DISC POLISHER APPARATUS

[76] Inventors: Kevin L. Brown, 77 Oak St., Sommerville, Mass. 02143; Edward B. Glicken, 1004 N. Clark, Apt. 1S, Chicago, Ill. 60610

[21] Appl. No.: 534,485

[22] Filed: Jun. 6, 1990

[51] Int. Cl.$^5$ ............................................... B24B 5/00
[52] U.S. Cl. ................................... 51/129; 51/109 R; 51/131.1
[58] Field of Search .................. 51/109 R, 129, 131.1, 51/125.5, 131.2, 131.3, 131.4, 132, 281 SF

[56] References Cited

U.S. PATENT DOCUMENTS

| | | | |
|---|---|---|---|
| 4,179,852 | 12/1979 | Barnett | 51/281 SF |
| 4,520,470 | 5/1985 | d'Alayer de Costemore d'Are | 369/72 |
| 4,556,433 | 12/1985 | Clausen | 134/6 |
| 4,561,142 | 12/1985 | Mischenko et al. | 15/97 R |
| 4,569,098 | 2/1986 | Kawabe | 15/114 |
| 4,713,856 | 12/1987 | Clausen | 15/97 R |
| 4,783,870 | 11/1988 | Yeung | 15/97 R |

*Primary Examiner*—Bruce M. Kisliuk
*Assistant Examiner*—Lawrence Cruz
*Attorney, Agent, or Firm*—Dick and Harris

[57] ABSTRACT

A disc polisher apparatus for the abrasive removal of surface scratches from a laser scanned digitally encoded storage disc, such that the presence of surface scratches could otherwise serve to deflect the optical scanning of the disc so as to impair the ability to read and retrieve the data stored. The apparatus includes rotating polishing pads which in association with an abrasive compound repair the damaging scratches. The disc rests upon a disc platform, having a biased shaft, and is positioned slightly above the polishing pads. A spring biased disc depression pad, attached to the cover of the apparatus, engages with the disc and a portion of the disc platform as the cover is being closed. The disc depression pad, in cooperation with the cover, serves to force the disc platform and disc downward, so that the disc engages in operational contact with the rotating polishing pads.

20 Claims, 3 Drawing Sheets

DISC POLISHER APPARATUS

BACKGROUND OF THE INVENTION

The present invention relates in general to polishing and repair devices, and in particular, to a disc polisher apparatus for the abrasive removal of surface scratches from a laser scanned digitally encoded storage disc, which scratches may otherwise serve to obstruct the scanning process and prevent the stored data from being retrieved from the disc.

Developments in data storage technology has resulted in the increasing use of compact disc technology where digitally encoded data is permanently stored on a media and retrieved on or "read" by optical scanning mechanisms. Such encoding is represented by a multiplicity of "pits" and "lands" which are arranged in concentric circular tracts on one side of the disc itself. A reflective surface, such as a thin sheet of aluminum foil, is then applied to the side where the pits and lands have been formed. A laser beam then scans the disc during operational play. The laser beam directed onto the disc reaches the reflective surface where it is then reflected by the pits and lands which it has scanned. The pits and lands thus form digital information which may be converted into an analog signal such as music which can be heard by the human ear, or remain as digital data for use by a computer.

For many years, industry, as well as the consuming public, have utilized devices which are intended to clean a media storing disc which over time tends to collect deposits which hamper the ability to retrieve stored data. However, few, if any prior art devices are intended to polish and repair the disc in an abrasive manner. Indeed, such prior art devices are particularly designed to avoid abrasive polishing due to the fact that abrasive cleaning techniques can, if not properly controlled, severely damage an otherwise unscratched disc surface.

While it is unlikely that relatively minor scratches on the non-reflective side of the disc will impair the intended results of the scanning process, relatively deep scratches located on such a surface can severely effect the output. If such a scratch is relatively deep (usually caused by mishandling of the disc itself), the beam emitted from the laser during scanning will actually refract. Such refraction can cause data to be missed making the disc completely inoperable. It is these types of scratches which the prior art has not addressed. Furthermore, the mere removal of such scratches does not necessarily adequately recondition the disc. The removal of these scratches must be effectuated while maintaining a substantially parallel disc surface. Failure to do so can result in undesirable refraction of the laser beam.

It is thus an object of the present invention to provide a disc polishing apparatus capable of substantially repairing relatively deep damaging scratches in the surface of a digitally encoded disc which has made the disc undesirable for play, or completely inoperable, so as to enable the disc to be played normally once again.

It is also an object of the present invention to provide a disc polishing apparatus which substantially, and abrasively repairs such damaging scratches while maintaining a relatively parallel surface to the digitally encoded disc after such abrasive repair of the scratches.

It is further an object of the present invention to provide a disc polishing apparatus with a motor-driven mechanical arrangement for the polishing of the disc.

These and other objects of the invention will become apparent in light of the present specification and drawings.

DETAILED DESCRIPTION OF THE DRAWINGS

Figure 1:
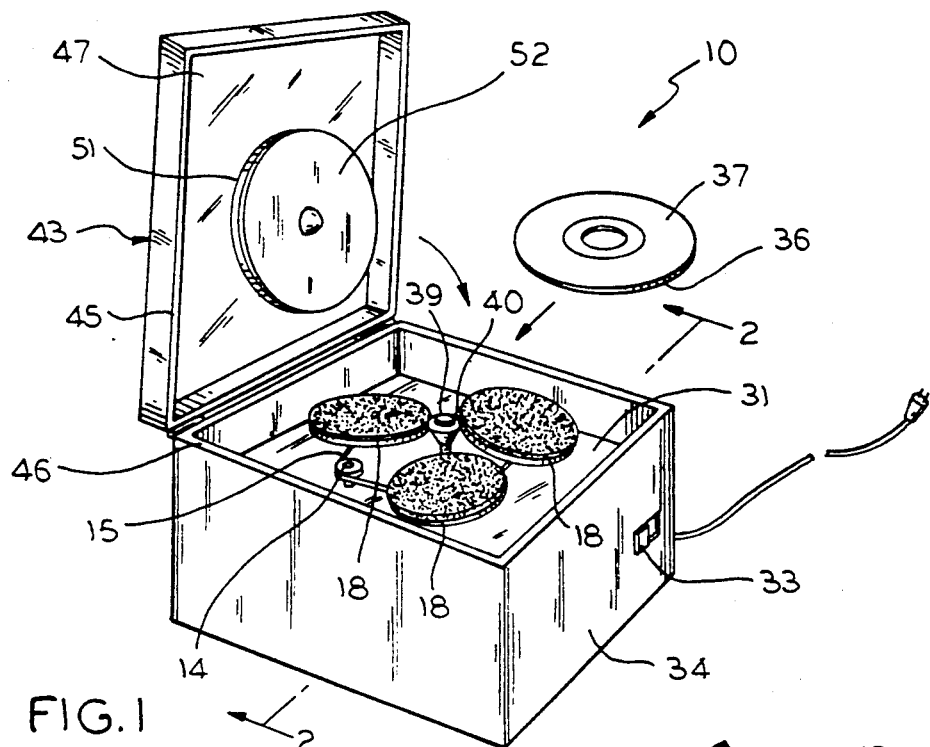
FIG. 1 of the drawings is a perspective view of the disc polisher apparatus, prior to inserting the disc onto the disc platform, showing in particular, the relationship of the polishing pads around the disc platform within the base unit, and the positioning of the disc depression pad attached to the cover.

While this invention is susceptible of embodiment in many different forms, there is shown in the drawings and will herein be described in detail, one embodiment with the understanding that the present disclosure is to be considered as an exemplification of the principles of the invention and is not intended to limit the invention to the embodiment illustrated.

Figure 2:
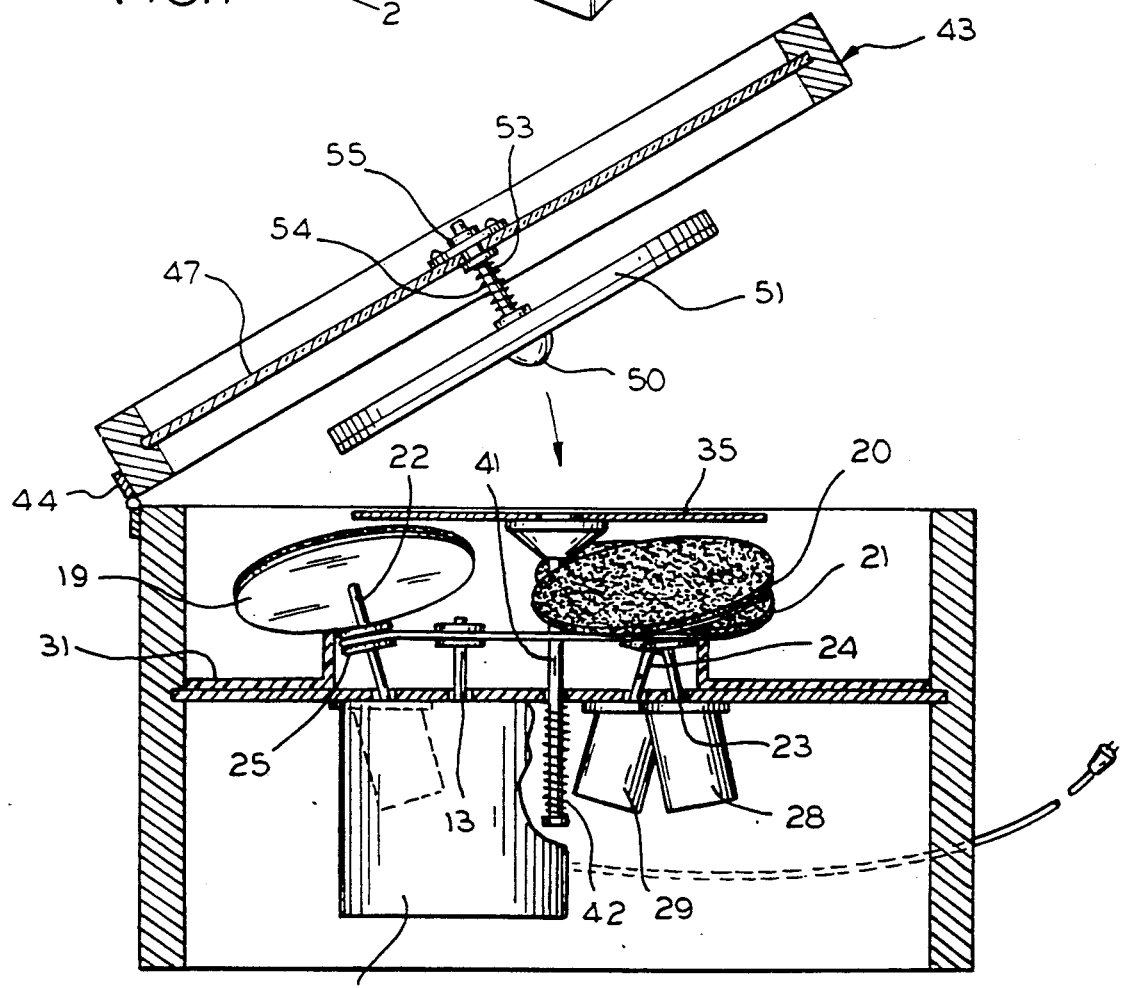
FIG. 2 of the drawings is an elevated cross-sectional view taken along lines 2—2 of FIG. 1 and looking in the direction of the arrows, showing the positioning of the disc upon the disc platform, prior to the cover of the apparatus being closed, as well as the biased shaft of the disc platform, and the biased shaft of the disc depression means.

Disc polisher apparatus 10 is shown in FIG. 1 and FIG. 2 as including base unit 11 and cover 43 which is hingedly attached to base unit 11. Base unit 11 comprises side walls, such as side wall 34, and support plate 31. Support plate 31 serves to retain motor 12, disc polishing means 19, 20 and 21 and disc platform 40. In this embodiment, motor 12 is capable of rotating shaft 13 between 800 to 2000 RPM.

Each of the disc polishing means 19, 20 and 21, include shafts 22, 23 and 24 respectively, which are attached to support plate by mounting bearings, such as mounting bearings 28 and 29, and a pulley attached to such shaft, such as pulley 25. Each of the pulleys on shafts 22-24 are engaged by a single belt 15 positioned around each of the pulleys on shafts 22-24, as well as being positioned around pulley 14 which is attached to shaft 13 of motor 12. Accordingly, by pressing power switch 33, which is located on front wall 34 of base unit 11, into the on position, shaft 13, and accordingly pulley 14 begin to rotate. Such rotation causes belt 15 to rotate pulleys, such as pulley 25, on each of shafts 22-24, through frictional engagement, thereby causing disc polishing means 19 through 21 to rotate as well. Pressing switch 33 to the off position ceases all such rotation.

Prior to actually engaging rotation of disc polishing means 19-21, disc 35 is placed onto disc platform 40. Proper positioning of disc 35 on platform 40 is ensured when disc hub 37 of disc 35 is placed over and around center portion 39 of disc platform 40 as it is important that repair side 36 of disc 35, is positioned adjacent to polishing pads 18 of disc polishing means 19-21. Once disc 35 is properly seated, and prior to cover 43 being closed, it can be observed that repair side 36 of disc 35 will not be in contact with pads 18 of disc polishing means 19, 20 and 21.

Figures 5, 6, 7:
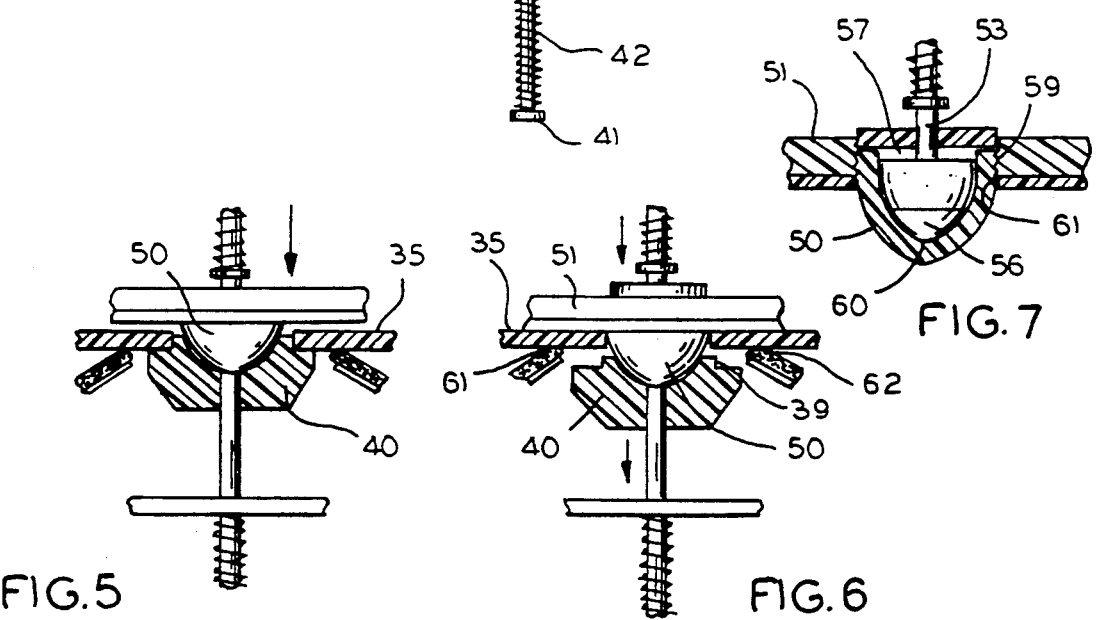
FIG. 5 of the drawings is a sectional view of the tip of the disc depression means, and particularly showing the operable cooperation of the tip with the center portion of the disc platform.
FIG. 6 of the drawings is a sectional view of the centering means of the disc polisher apparatus, showing in particular, the disc platform forced below and out of contact with the bottom of the disc, once the apparatus cover has been completely closed.
FIG. 7 of the drawings is a sectional view of the centering means of the disc depression means, in cross-section, showing the tip of the shaft having a configuration substantially similar to the internal area of the centering means.

Bottom edge 45 of cover 43 is positioned into abutment with top edge 46 of base unit 11, when cover 43 is fully closed. Just prior to fully closing cover 43, centering means 50, which is threadedly attached to rotational disc depression means 51, as can be seen in FIG. 7, engages with center portion 39 of disc platform 40. As cover 43 is closed further, rotational disc depression means 51, and more specifically, friction pad 52 which is positioned adjacent rotational disc depression means 51, abuts with substantially all of the top surface of disc 35.

Rotational disc depression means 51 is attached to biased shaft 53. The shaft itself includes spring 54 which is positioned between disc depression means 51 and viewing area 47, of cover 43. The shaft is held in place by retaining clip 55. Disc platform 40 also includes shaft 41 having spring 42, which extends below support plate 31. Spring 42 is positioned around shaft 41, and is located below support plate 31. Accordingly, spring 42 actually maintains a portion of disc platform 40 above pads 18 of disc polishing means 19-21 prior to downward force being applied to disc platform 40.

Figure 4:
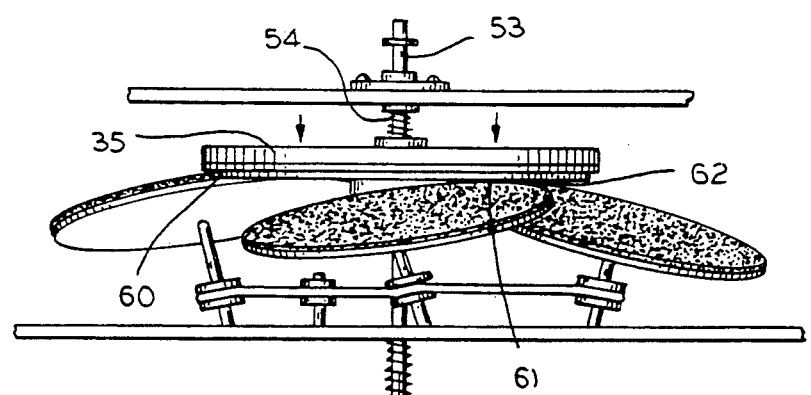
FIG. 4 of the drawings is an elevated sectional view of the disc polisher apparatus, particularly showing, the disc platform, and accordingly the disc is forced downward after the cover has been closed, maintaining the disc in contact with a portion of the polishing pads.

Spring 54 is considerably stronger than spring 42, and accordingly, disc platform 40, as well as disc 35, will be forced downward by disc depression means 51 as cover 43 is being closed. When cover 43 is completely closed, disc 35 will be sandwiched between disc depression means 51 and pads 18 of disc polishing means 19-21 with substantially equal pressure being applied to disc 35. Furthermore, when cover 43 is completely closed, disc platform 40 will be forced out of any contact, whatsoever, with disc 35, as more fully shown in FIG. 4. Accordingly, disc 35 itself, is secured in place by the pressure exerted thereon from rotational disc depression means 51, which thereby forces the disc against the polishing contact points 60-62 of pads 18 of disc polishing means 19 through 21, also as shown in FIG. 4. Disc 35 is further precluded from being displaced from between disc depression means 51 and pads 18 of polishing means 19-21 due to centering means 50 of disc depression means 51, remaining positioned through hub 37 of disc 35, and in contact with center portion 39 of disc platform 40. Damage to hub 37 of disc 35 is avoided during operation of apparatus 10 as the result of centering means 50 being preferably constructed of a material having a relatively low coefficient of friction—such as nylon or polyethylene.

Figure 3:
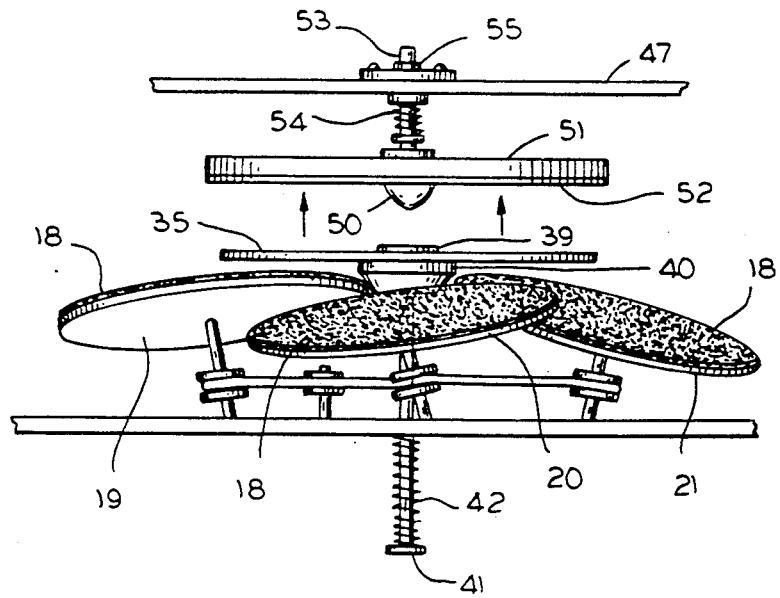
FIG. 3 of the drawings is an elevated sectional view of the disc polisher apparatus showing in particular, positioning of the disc platform, and accordingly, the disc, above the polishing pads prior to closure of the cover.

The mechanisms attached to cover 43 and those located within base unit 11, as shown in FIG. 1 and 2, are shown in sectional views in FIG. 3 and FIG. 4, showing in particular the operable cooperation between centering means 50 of rotational disc depression means 51, and center portion 39 of disc platform 40. As can be seen, when disc depression means 50 is positioned away and out of contact with disc 35, spring 42 on shaft 41 of disc platform 40 is in a partially compressed position. Accordingly, a portion of disc platform 40, and in turn, repair surface 36 of disc 35 as shown in FIG. 1, is positioned above pads 18 of disc polishing means 19, 20 and 21. However, as cover 43 is lowered into the closed position, disc depression means is forced down in the direction of the arrows into abutment with surface of disc 35. In addition, centering means 50 of disc depression means 51 is simultaneously engaged with center portion 39 of disc platform 40, as more fully shown in detail in FIGS. 5 and 6. Forcing disc depression means 51 downward in the direction of the arrows overcomes the tension of spring 42 around shaft 41, thus forcing disc platform 40 as well as center portion 39 below polishing contact portions 60, 61 and 62, once cover 43 is fully closed. In addition, displacement of disc platform 40 results in complete disengagement of disc platform 40 and its center portion 39 from any contact whatsoever with disc 35.

The force exerted upon disc 35 from disc depression means 51, when cover 43 is fully closed is substantially uniformly applied to disc 35 so as to ensure substantially parallel polishing of repair surface 36 of disc 35. In this embodiment, the angle of each of the disc polishing means 19, 20 and 21, and accordingly the pads 18, are each positioned at approximately 11 degree angles to the horizontal plane of repair side 36 of disc 35. Furthermore, contact points 60-62, as shown in FIG. 5, of pads 18 each extend substantially across the radius of repair side 36 of disc 35. As disc polishing means 19-21 rotate, disc 35 begins to rotate as well, together with disc depression means 51. While rotating, pads 18, serve to polish substantially the entire region located between hub 37 of disc 35 and the disc's peripheral edge.

After polishing has been completed, cover 43 is opened, thereby causing spring 42 on shaft 41 to compress back to its original position. As displacement of spring 42 occurs, shaft 41 is simultaneously forced upward, in the direction of the arrows, until center portion 39 extends through hub 37 of disc 35, thus causing disc platform 40 to come into contact with repair side 36 of disc 35, and then further extending upward so as to raise disc 35 completely above polishing contact points 60-62 of pads 18. Once this occurs, disc 35 can be removed from base unit 11.

Centering means 50 is shown in its seated position within center portion 39 of disc platform 40 in FIG. 5 and FIG. 6. When properly seated, substantially equal pressure will be applied to disc 35 so that polishing contact points, such as polishing contact points 61 and 62, will enable even polishing of substantially all of repair side 36 of disc 35. Furthermore, as can be seen in FIG. 5, once cover 43 is closed, and accordingly disc platform 40 is forced down and out of contact with disc 35, at least a portion of centering means 50 remains seated within center portion 39 of disc platform 40. This seating ensures that disc depression means 51 is substantially concentrically aligned with disc 35.

Also shown in FIG. 6 is the internal area 57 of centering means 50. As can be seen, the internal area has a configuration similar to that of tip 56 of shaft 53.

A sectional view of centering means 50 is shown in partial cross-section in FIG. 7. Tip 56 is shown abutting with the bottom of internal area 57 of centering means 50. Such a configuration of tip 56 facilitates the direction of forces, caused as a result of closing cover 43, towards point 60 of tip 56, thereby causing substantially equal pressure to be distributed to disc 35. In addition, centering means 50 is actually threadedly attached to disc depression means 51. Threads 59 on centering means 50 cooperate with threads 61 on disc depression means 51, to enable such attachment.

Figure 8:
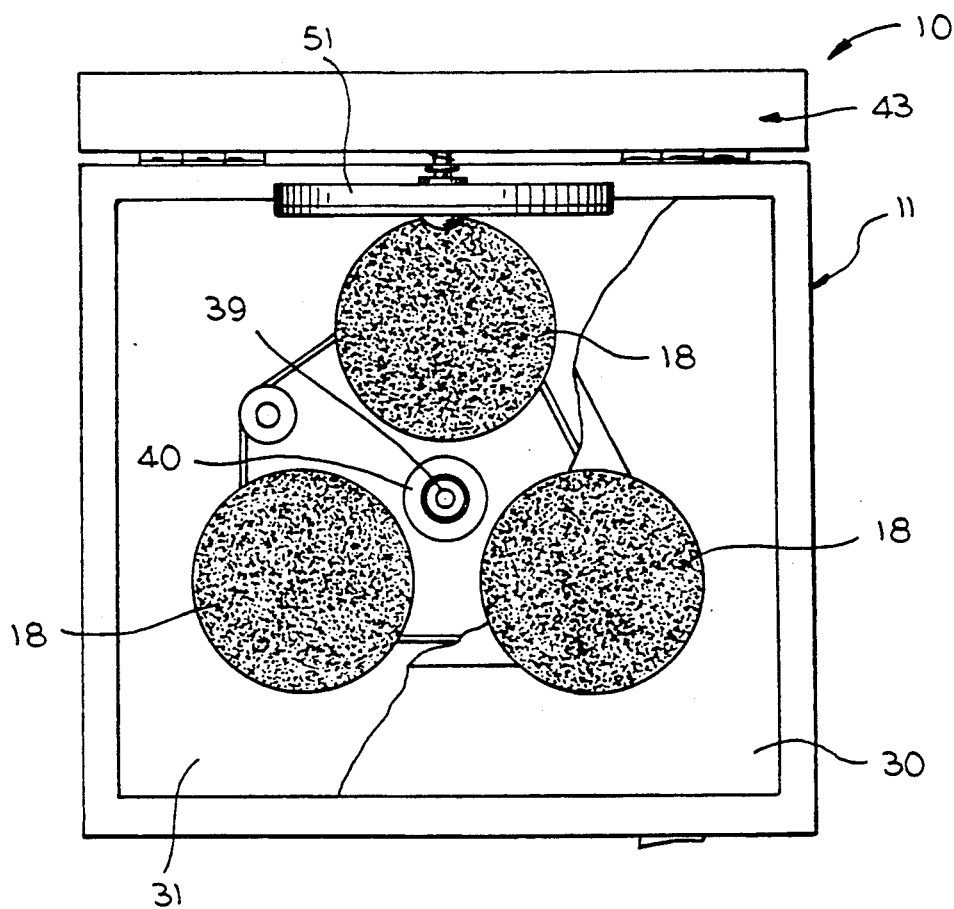
FIG. 8 of the drawings is a top plan view of the disc polisher apparatus, in partial cut-away, showing the positioning of the disc polishing pads around the disc platform, as well as the motor driven pulley which cooperates with the belt to cause rotation of the disc polishing pads.

A top view of disc polisher apparatus 10 is shown in FIG. 8 as including cover 43 and base unit 11. Furthermore, as can be seen, support plate 30 is protected by a shield 31. This shield serves to preclude particulate, caused during actual polishing of disc 35, from penetrating through support plate 30, and possibly down and below into the motor area, as well as to prevent such particulate from contact with pulleys, such as pulley 25, and mounting bearings, such as mounting bearings 28 and 29 as shown in FIG. 2. Such particulate could result from polishing or rubbing compound which was applied to pads 18 prior to repairing a disc, such as disc 35, as shown in FIG. 1. Such compound can be manually applied to pads 18 prior to each use, or pads 18 may have such polishing or rubbing compound actually impregnated therein.

Figure 9:
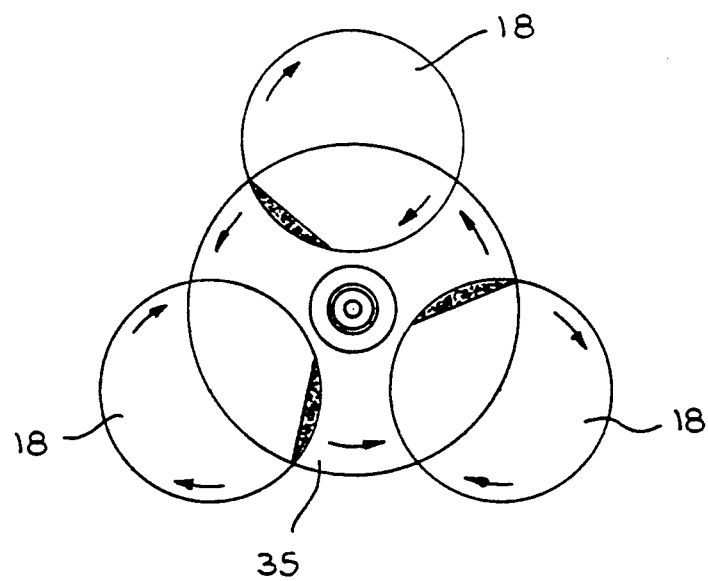
FIG. 9 of the drawings is a functional illustration drawing, of the disc polishing pads positioned below the disc, showing the direction of rotation of the polishing pads and area of contact between the disc polishing pads and the disc.

As pads 18, and accordingly disc polishing means 19 through 21 rotate in the direction of the arrows, as shown in FIG. 9, centrifugal force will expel particulate originally on pads 18 or disc 35 itself. Furthermore, the direction of rotation of pads 18, coupled with the speed at which they are turning, as well as the angle of contact with the repair side 36 of disc 35 itself, as shown in FIG. 1, determines the direction, and speed in which disc 35 rotates during polishing.

The foregoing description and drawings merely explain and illustrate the invention and the invention is not limited thereto except insofar as the appended claims are so limited as those skilled in the art who have the disclosure before them will be able to make modifications and variations therein without departing from the scope of the invention.

What is claimed is:

1. A disc polisher apparatus for the polishing and repair of media storage discs having a repair side, said apparatus comprising:

a base unit having a top side and a bottom side opposite said top side;

disc support means operably attached to said base unit for supporting said media storage disc;

one or more rotational disc polishing means attached to said base unit and positioned adjacent said disc support means for operable rotational contact with said repair side of said media storage disc when said media storage disc has been positioned upon said disc support means;

rotational disc depression means having a disc contact side for securing stabilizing said media storage disc against said one or more rotational disc polishing means;

said disc contact side of said disc depression means being operably and removably positioned in substantially concentric alignment with said media storage disc;

centering means associated with said disc contact sides of said rotational disc depression means for aligning said rotational disc depression means with said media storage disc after said media storage disc has been placed upon said disc support means to as to facilitate substantially even distribution of pressure upon said media storage disc during said rotational contact with said disc polishing means; and, rotation means for causing the rotation of said rotational disc polishing means, and in turn said media storage disc.

2. The invention according to claim 1 in which said base unit comprises four side walls, and a substantially horizontal support plate defining an upper and a lower region, for substantially horizontal support plate serving to shield at least a portion of said disc support means, said one or more rotational disc polishing means and said rotation means from particulate which may occur during said polishing of said media storage disc.

3. The invention according to claim 2 in which said base unit further includes a support plate positioned between said four side walls of said base unit, for supporting said disc support means, said one or more rotational disc polishing means and said rotation means.

4. The invention according to claim 3 in which said base unit further includes shielding means adjacent to said support plate for precluding particulate caused during cleaning and repair of said media storage disc from inadvertently coming into contact with at least a portion of said disc support means, said one or more rotational disc polishing means and said rotation means.

5. The invention according to claim 1 in which said rotational disc depression means has a diameter at least as large as the diameter of said media storage disc.

6. The invention according to claim 1 in which the rotational disc depression means further includes a friction intensifying pad positioned adjacent to said disc contact side of said disc depression means for precluding inadvertent slippage of said media storage disc, while simultaneously precluding damage to the media storage disc which may otherwise occur during operation of said disc polishing apparatus.

7. The invention according to claim 1 in which the rotation means comprises a motor driving said one or more rotational disc polishing means.

8. The invention according to claim 7 in which said rotation means includes an on-off switch.

9. The invention according to claim 7 in which said rotation means includes a timing device which automatically cuts off the power to the apparatus after a designated period of time.

10. A disc polisher apparatus for the polishing and repair of media storage discs having a repair side, said apparatus comprising:

a base unit having a top side and a bottom side opposite said top side;

disc support means operably attached to said base unit for supporting said media storage disc;

one or more rotational disc polishing means attached to said base unit and positioned adjacent said disc support means for operable rotational contact with said repair side of said media storage disc when said media storage disc has been positioned upon said disc support means;

rotational disc depression means having a disc contact side for securing stabilizing said media storage disc against said one or more rotational disc polishing means;

centering means associated with said disc contact said of said rotational disc depression means for aligning said rotational disc depression means with said media storage disc after said media storage disc has been placed upon said disc support means so as to facilitate substantially even distribution of pressure upon said media storage disc during said rotational contact with said disc polishing means;

said disc polisher apparatus further includes a cover having a first side and a second side opposite said first side, hingedly attached to said base unit for substantially enclosing said disc support means, said one or more rotational disc polishing means, said rotation means and said rotational disc depression means between said base unit and said cover.

11. The invention according to claim 10 in which said rotational disc depression means is attached to said cover.

12. The invention according to claim 11 in which said cover means includes a viewing area for visual observation of at least a portion of the area between said four side walls of said base unit.

13. The invention according to claim 10 in which said rotational disc depression means further includes a spring biased shaft, having a first end and a second end opposite said first end, concentrically positioned through and past said rotational disc depression means; said first end being attached to said cover means and said second end being concentrically attached to said centering means.

14. A disc polisher apparatus for the polishing and repair of media storage discs having a repair side, said apparatus comprising:

a base unit having a top side and a bottom side opposite said top side;

disc support means operably attached to said base unit for supporting said media storage disc;

one or more rotational disc polishing means attached to said base unit and positioned adjacent said disc support means for operable rotational contact with said repair side of said media storage disc when said media storage disc has been positioned upon said disc support means;

rotational disc depression means having a disc contact side for securing stabilizing said media storage disc against said one or more rotational disc polishing means;

centering means associated with said disc contact said of said rotational disc depression means for aligning said rotational disc depression means with said media storage disc after said media storage disc has been placed upon said disc support means so as to facilitate substantially even distribution of pressure upon said media storage disc during said rotational contact with said disc polishing means;

rotation means for causing the rotation of said rotational disc polishing means, and in turn said media storage disc; and the disc support means comprises a disc platform having an indented center portion and a biased support shaft;

said biased support shaft enabling reciprocating displacement of said disc platform when said centering means attached to said disc contact side of said rotational disc depression means operably engages with the center portion of the disc platform so as to force said disc platform below at least a portion of the one or more rotational disc polishing means, and in turn, causing said media storage disc to be positioned between said one or more rotational discs and said rotational disc depression means without said media storage disc being in contact with said disc platform.

15. The invention according to claim 14 in which the disc platform includes a radial lip depending from said disc contact side of said disc platform and concentrically positioned around said center portion of said disc platform so as to facilitate proper seating of said media storage disc on said disc platform.

16. The invention according to claim 15 in which said center portion of said disc platform is constructed of a material having a relatively low coefficient of friction so as to preclude inadvertent binding with said centering means during operation of said disc polisher apparatus.

17. The invention according to claim 16 in which the centering means is constructed of the same material as the center portion of the disc platform.

18. The invention according to claim 14 in which said disc polisher apparatus further includes a cover having a first side and a second side opposite said first side, hingedly attached to said base unit for substantially enclosing said disc support means, said one or more rotational disc polishing means, said rotation means and said rotational disc depression means between said base unit and said cover;

said rotational disc depression means further includes a spring biased shaft, having a first end and a second end opposite said first end, concentrically positioned through and past said rotational disc depression means;

said first end being attached to said cover means and said second end being concentrically attached to said centering means; and the spring biased shaft of the rotational disc depression means is substantially stronger than the biased support shaft of the disc support means so as to enable the disc support means, and in turn, the disc platform, to be forced below at least a portion of the one or more rotational disc polishing means as said cover is being closed.

19. A disc polisher apparatus for the polishing and repair of media storage discs having a repair side, said apparatus comprising:

a base unit having a top side and a bottom side opposite said top side;

disc support means operably attached to said base unit for supporting said media storage disc;

one or more rotational disc polishing means attached to said base unit and positioned adjacent said disc support means for operable rotational contact with said repair side of said media storage disc when said media storage disc has been positioned upon said disc support means;

rotational disc depression means having a disc contact side for securing stabilizing said media storage disc against said one or more rotational disc polishing means;

centering means associated with said disc contact said of said rotational disc depression means for aligning said rotational disc depression means with said media storage disc after said media storage disc has been placed upon said disc support means so as to facilitate substantially even distribution of pressure upon said media storage disc during said rotational contact with said disc polishing means;

rotation means for causing the rotation of said rotational disc polishing means, and in turn said media storage disc; and said one or more rotational disc polishing means each comprise pads positioned between seven to fifteen degree angles to the repair side of the media storage disc when said media storage disc is positioned on said disc platform.

20. The invention according to claim 19 in which each of said pads are impregnated with a polishing compound.

* * * * *

UNITED STATES PATENT AND TRADEMARK OFFICE
CERTIFICATE OF CORRECTION

PATENT NO. : 5,102,099
DATED : April 7, 1992
INVENTOR(S) : Brown, et al.

It is certified that error appears in the above-identified patent and that said Letters Patent is hereby corrected as shown below:

| | |
|---|---|
| Col. 6, Line 16 | Delete "to as to" and instead insert --so as to--. |
| Col. 6, Line 26 | Delete "for substantially" and instead insert --said substantially--. |
| Col. 7, Line 20 | Delete "polishing means;" and instead insert --polishing means; rotation means for causing the rotation of said rotational disc polishing means, and in turn said media storage disc; and--. |

Signed and Sealed this

Twentieth Day of July, 1993

Attest:

MICHAEL K. KIRK

Attesting Officer     Acting Commissioner of Patents and Trademarks